United States Patent
Matsuda et al.

(10) Patent No.: US 8,345,333 B2
(45) Date of Patent: Jan. 1, 2013

(54) DISPLACEMENT/DISTORTION MEASURING METHOD AND DISPLACEMENT/DISTORTION MEASURING APPARATUS

(75) Inventors: Hiroshi Matsuda, Nagasaki (JP); Masakazu Uchino, Fukuoka (JP); Yukihiro Ito, Saga (JP); Kousuke Yoshimaru, Saga (JP); Chikara Yamazaki, Saga (JP); Shuichi Yamazaki, Saga (JP); Kousuke Uchida, Saga (JP)

(73) Assignee: Smart Structures LLC, Rantoul, IL (US)

( * ) Notice: Subject to any disclaimer, the term of this patent is extended or adjusted under 35 U.S.C. 154(b) by 580 days.

(21) Appl. No.: 12/158,844

(22) PCT Filed: Dec. 21, 2006

(86) PCT No.: PCT/JP2006/325488
§ 371 (c)(1),
(2), (4) Date: Mar. 3, 2009

(87) PCT Pub. No.: WO2007/072905
PCT Pub. Date: Jun. 28, 2007

(65) Prior Publication Data
US 2009/0284804 A1    Nov. 19, 2009

(30) Foreign Application Priority Data

Dec. 21, 2005   (JP) .................................. 2005-368334

(51) Int. Cl.
*G03F 3/08* (2006.01)
*G06K 15/00* (2006.01)
*G06K 9/00* (2006.01)
*G02B 27/42* (2006.01)
*G01B 11/14* (2006.01)

(52) U.S. Cl. ......... 358/521; 358/2.1; 382/108; 250/550; 356/614

(58) Field of Classification Search .................. None
See application file for complete search history.

(56) References Cited

U.S. PATENT DOCUMENTS 4,967,093 A * 10/1990 Takemori .................... 250/559.2
5,856,879 A *  1/1999 Suzuki et al. ............... 359/210.1
(Continued)

FOREIGN PATENT DOCUMENTS
EP        1152210 A2    11/2001
(Continued)

OTHER PUBLICATIONS

"Digital Speckle Pattern Interferometry and Related Techniques"; Edited by Pramod K. Rastogi; 2001 John Wiley & Sons Ltd., West Sussex, England.
(Continued)

*Primary Examiner* — Twyler Haskins
*Assistant Examiner* — Barbara Reinier
(74) *Attorney, Agent, or Firm* — Honigman Miller Schwartz and Cohn LLP

(57) ABSTRACT

Provided are a displacement/distortion measuring method and a displacement/distortion measuring apparatus for easily and highly accurately measuring displacement or distortion of an object. An image of the surface of the measuring object is picked up by a line scanner apparatus adhered or brought close to the surface of the measuring object. The image is taken, displacement or distortion is measured by image analysis of the image of the measuring object surface prior to time lapse and that after time lapse, and displacement or distortion measuring results are outputted.

13 Claims, 13 Drawing Sheets

U.S. PATENT DOCUMENTS

2003/0030820 A1 2/2003 Kim et al.
2004/0005082 A1* 1/2004 Lee et al. .................... 382/103

FOREIGN PATENT DOCUMENTS

| EP | 1467196 A1 | 10/2004 |
|---|---|---|
| JP | 04346004 B2 | 1/1992 |
| JP | 08-063593 | 3/1996 |
| JP | 08-086630 | 4/1996 |
| JP | 2005-099012 | 4/2005 |
| JP | 2005099012 A | 4/2005 |

OTHER PUBLICATIONS

Supplementary European Search Report for Application EP06842996 dated Sep. 29, 2010.

European Office Action for Application 06842996.8 dated Jul. 27, 2011.

* cited by examiner

DISPLACEMENT/DISTORTION MEASURING METHOD AND DISPLACEMENT/DISTORTION MEASURING APPARATUS

TECHNICAL FIELD

The present invention relates to a displacement/strain measuring method and displacement/strain measuring apparatus, which measure the displacement or strain of an object.

BACKGROUND ART

To secure safety of an apparatus, equipment, and a structure, such as an iron bridge or concrete structure, it is necessary to grasp the states, such as stress, strain and deformation from the design phase to the in-service phase. For example, hard and fragile materials, such as concrete or ceramics, unlike an elastoplastic material like a metal material, have a small deformation range until cracking, which is a phenomenon of a "minute strain area" of several hundred micro stain order, thus requiring a relatively high-precision measurement. Conventionally, the main stream of the method of measuring stress, strain and deformation is local measurement using a strain gauge. A strain gauge is configured to have a thin metal wire to be a resistor disposed in a folded state in an insulating film. The strain gauge is adhered to the top surface an object to be measured, and stretches or shrinks according to the stress, strain, and deformation of the to-be-measured object, so that the stress, strain, deformation and the like of the to-be-measured object is measured from a change in the resistance of the thin metal wire to be a resistor.

Multiple measuring methods of measuring the amount of displacement (deformation) or strain through image processing have been proposed recently as other measuring methods. There is a digital image correlation method as a method of simultaneously acquiring the amount of deformation and the direction thereof using a digital image picked up by a CCD camera or the like.

There are Patent Literature 1 and Non-patent Literature 1 as references on the related art. Patent Literature 1 discloses a technique on a 90-degree image rotating method and apparatus for fast rotating input digital image data by 90 degrees and outputting the image data. Non-patent Literature 1 discloses the principle and application of the digital image correlation method.

Patent Literature 1: Unexamined Japanese Patent Application KOKAI Publication No. H8-63593
Non-patent Literature 1: "Digital Speckle Pattern Interferometry and Related Techniques" edited by Pramod K. Rastogi (UK), John Wiley & Sons, Ltd. Press, 2001

DISCLOSURE OF INVENTION

The measuring method using a strain gauge however has problems such that installation and maintenance of the measuring apparatus are troublesome, and are not suitable for minute areas or irregular portions.

The digital image correlation method has characteristics such that the measuring apparatus or the like need not be placed on the top surface of a target object, thus making it possible to facilitate measurement of displacement or strain in the total field of view (in all directions), and is getting attention as a new displacement and strain measuring method. Since both methods calculate the amount of displacement or strain based on a plurality of digital images picked up by a CCD camera, they have the following problem, and methods proposed so far cannot realize high-precision displacement measurement and strain measurement.

That is, a measuring method using a CCD camera has (1) a difficulty in always keeping the environmental conditions, such as illumination, constant. (2) To execute high-precision analysis, the number of pixels of a CCD device is small. (3) Even execution of aberration correction of the camera lens becomes a large error factor. (4) Image strain occurs depending on the camera posture.

Therefore, a measuring method capable of carrying out simpler and high-precision measurement is desirable in measuring displacement and strain.

In consideration of the above points, it is an object of the present invention to provide a displacement/strain measuring method capable of carrying out simpler and high-precision measurement and a measuring apparatus therefor.

A displacement/strain measuring method according to the present invention comprising capturing an image of a surface of a to-be-measured object imaged by a line scanner apparatus set in close adhesion or in vicinity of the surface of the to-be-measured object; measuring a displacement or strain through an image analysis from an image of the surface of the to-be-measured object before time elapse and an image of the surface of the to-be-measured object after time elapse; and outputting a result of measuring the displacement or strain.

In the displacement/strain measuring method according to the present invention, an irregular pattern identifiable by different gradation values can be exposed at the surface of the to-be-measured object, and an image of the surface of the to-be-measured object can be captured by the line scanner apparatus.

In the displacement/strain measuring method according to the present invention, when there is an irregular pattern identifiable by different gradation values from the start, an image of the surface of the to-be-measured object can be captured directly.

In the displacement/strain measuring method according to the present invention, an image of the surface of the to-be-measured object which has an irregular pattern identifiable by different gradation values transferred thereto can be captured.

In the displacement/strain measuring method according to the present invention, image data in a main scan direction of the line scanner apparatus can be used as data of the image.

In the displacement/strain measuring method according to the present invention, image analysis of analyzing relative positions of individual corresponding pixels in two images before the time elapse and after the time elapse by referring to gradation values of the pixels can be used.

In the displacement/strain measuring method according to the present invention, an omnidirectional displacement or strain on a plane of an image can be measured by the image analysis.

In the displacement/strain measuring method according to the present invention, an image of the surface of the to-be-measured object imaged through scanning in two axial directions or three axial directions by a line sensor of the line scanner apparatus can be captured, and image data in a main scan direction of the line sensor can be used as data of the image.

A displacement/strain measuring apparatus according to the present invention comprises a line scanner apparatus having a light source and a line sensor; and a computer which captures an image of a surface of a to-be-measured object imaged by the line scanner apparatus set in close adhesion or in vicinity of the surface of the to-be-measured object, measures a displacement or strain through an image analysis from an image of the surface of the to-be-measured object before time elapse and an image of the surface of the to-be-measured object after time elapse, and outputs a result of measuring the displacement or strain.

The displacement/strain measuring apparatus according to the present invention can be configured so that the line scanner apparatus includes two or three line sensors in two axial directions or three axial directions on a plane.

The displacement/strain measuring apparatus according to the present invention can be configured so that the line sensor of the line scanner apparatus is disposed rotatable on a plane.

The displacement/strain measuring apparatus according to the present invention can be configured so that the line sensor of the line scanner apparatus is disposed in a radial direction or a diametrical direction in such a way as to pass a radial center, and is disposed rotatable with the radial center being a rotational center.

The displacement/strain measuring method according to the present invention can measure a displacement or strain by capturing an image of a surface of a to-be-measured object imaged by a line scanner apparatus set in close adhesion or in vicinity of the surface of the to-be-measured object, and performing an image analysis from an image of the surface of the to-be-measured object before time elapse and an image of the surface of the to-be-measured object after time elapse.

The use of the line scanner apparatus can acquire an image with a high resolution, thereby ensuring high-precision measurement. In addition, adjustment of illumination can be made unnecessary, so that measurement is possible under a constant illumination environment. Further, image strain does not appear over the entire measurement range.

Image analysis is carried out well when there is an irregular pattern identifiable by different gradation values at the surface of the to-be-measured object, or by separately exposing such an irregular pattern thereat in case where there is no such irregular pattern. Image analysis is also carried out well when an image of the surface of the to-be-measured object which has an irregular pattern identifiable by different gradation values transferred thereto is captured.

The direction of analysis in calculating a displacement or strain is aligned with the main scan direction of the line scanner apparatus which has captured image data. High-precision measurement can be executed in the total-field-of-view area by capturing an image of the surface of the to-be-measured object through scanning in two axial directions or three axial directions by the line sensor of the line scanner apparatus, and executing analysis using the foregoing method.

A displacement/strain measuring apparatus according to the present invention comprises a line scanner apparatus and a computer which captures an image of the surface of a to-be-measured object imaged by the line scanner apparatus, and measures a displacement or strain through an image analysis from images before time elapse and after time elapse, thus making it possible to capture a high-resolution image and ensure high-precision measurement.

A notebook personal computer, for example, which is portable can be used as a computer, in which case, the portability is excellent and measurement can be carried out simply at any place.

In the case of the configuration where the line scanner apparatus has two line sensors in two axial directions or three line sensors in three axial directions on a plane, or the configuration where the line sensor of the line scanner apparatus is disposed rotatable on a plane, or the configuration where the line sensor is disposed in a radial direction or a diametrical direction in such a way as to pass a radial center, and is disposed rotatable with the radial center being a rotational center, it is possible to acquire a high-resolution image and ensure high-precision measurement in the total-field-of-view measurement.

BEST MODE FOR CARRYING OUT THE INVENTION

An embodiment of the present invention will now be described with reference to the accompanying drawings.

Figure 1:
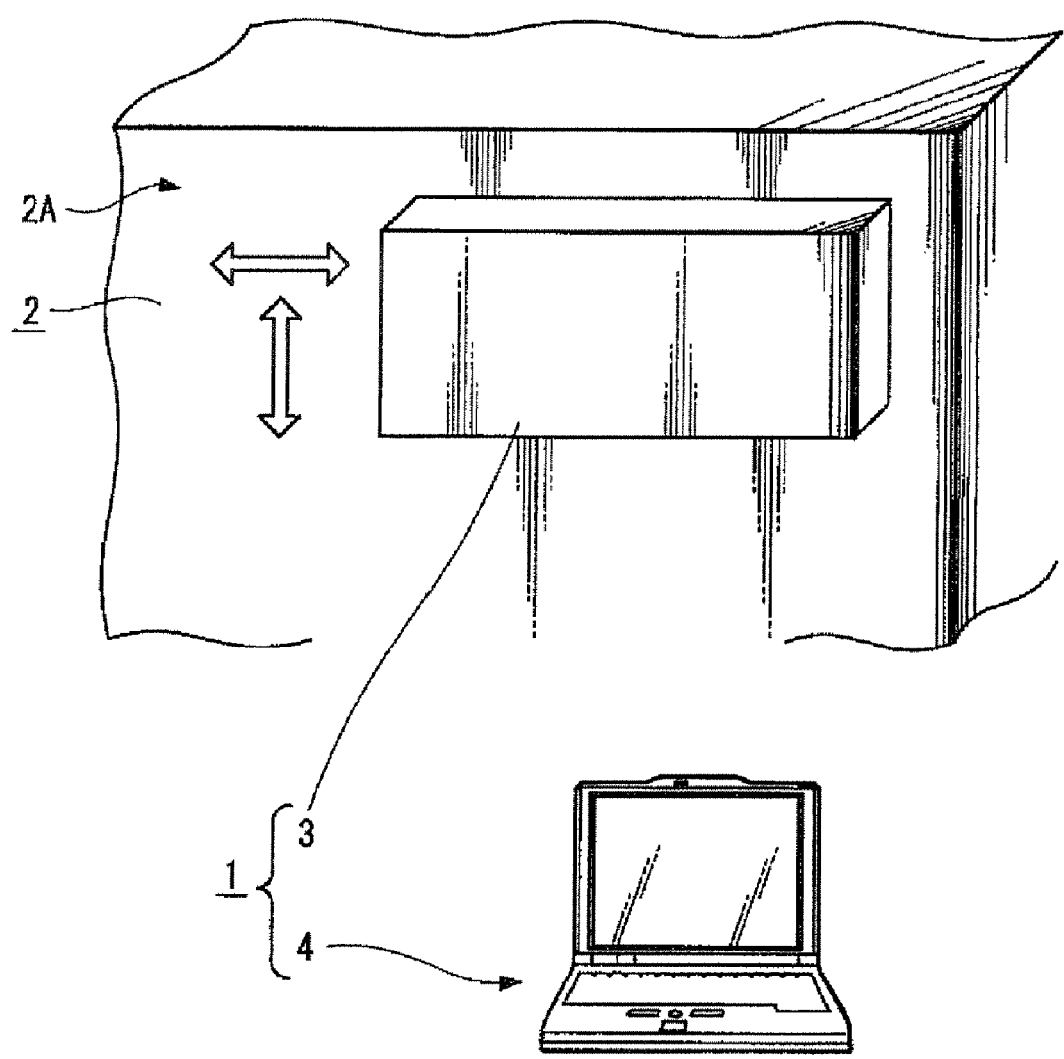
FIG. 1 is a schematic configurational diagram of a displacement/strain measuring apparatus to be adapted to a displacement/strain measuring method according to the present invention.
Figure 2:
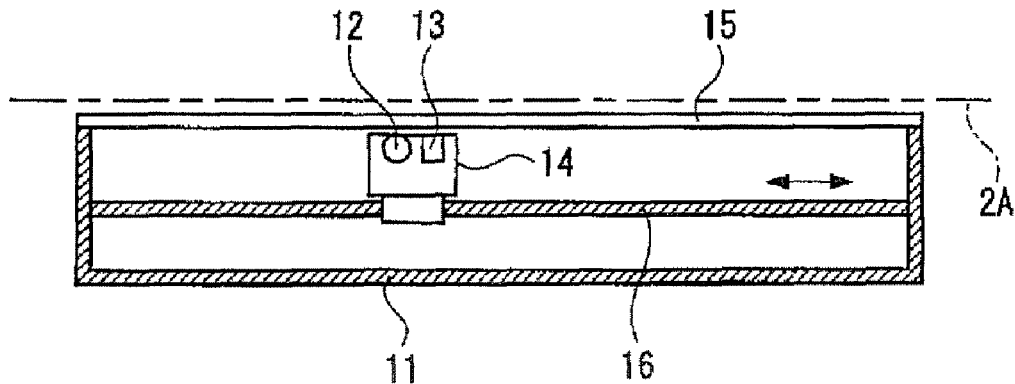
FIG. 2 is a schematic cross-sectional view showing one embodiment of a flat-bed image scanner to be adapted to the displacement/strain measuring apparatus according to the present invention.

FIGS. 1 and 2 shows the schematic configuration of a displacement/strain measuring apparatus to be adapted to a displacement/strain measuring method according to the present invention. A displacement/strain measuring apparatus 1 according to the embodiment comprises a contact line scanner apparatus typified by a flat-bed image scanner for imaging a top surface 2A of an object 2 to be measured, e.g., the surface of a concrete structure, namely a flat-bed image scanner 2 in the embodiment, and a computer or a personal computer 4 in the embodiment, which executes a sequence of processes of capturing the image of the top surface of a to-be-measured object imaged by the flat-bed image scanner 3, measuring a displacement or strain of the to-be-measured object from the image through image analysis, and outputting the measuring result. Image analysis is carried out from an image of a to-be-measured object before time elapse (e.g., before deformation when deformation occurs) and an image thereof after time elapse (e.g., after deformation when deformation occurs). As the personal computer 3, a notebook personal computer (hereinafter abbreviated as notebook computer) is preferable.

The flat-bed image scanner 3, as shown in the schematic diagram of FIG. 2, includes a light source 12, a line sensor or a line sensor 13 having a plurality of pixels aligned in one direction in the embodiment, and an unillustrated drive mechanism, signal processing circuit (encoder), etc. in a casing 11, which has at least a flat surface to face the top surface 2A of the object to be measured, and which is, for example, rectangular parallelepiped. The light source 12 and line sensor 13 constitute an imaging body 14. The imaging body 14 is arranged in such a way that, with the positional relationship of the individual components 12, 13 being set, the entire imaging body 14 is driven on a guide rail 16 by drive means (e.g., motor drive) to scan in a direction perpendicular to the lengthwise direction of the line sensor 13. A transparent protection plate 15 is disposed at the surface of the casing 11 which is opposite to the top surface 2A of the to-be-measured object 2.

With the flat-bed image scanner 3 arranged in contact with or close to the top surface 2A of the to-be-measured object 2 to perform imaging, light from the light source 12 is irradiated on the top surface 2A of the to-be-measured object 2, and an optical image reflected from the top surface 2A is received by the line sensor 13. Then, the imaging body 14 is caused to scan in the one direction by the drive mechanism, the top surface 2A of the to-be-measured object 2 is imaged within the range of the area that is determined by the flat-bed image scanner 3.

The flat-bed image scanner 3 can be constituted by a so-called reduction type optical scanner, which reduces the image of an object to be picked up and causes the image to be read into the CCD line sensor 13.

Figure 3:
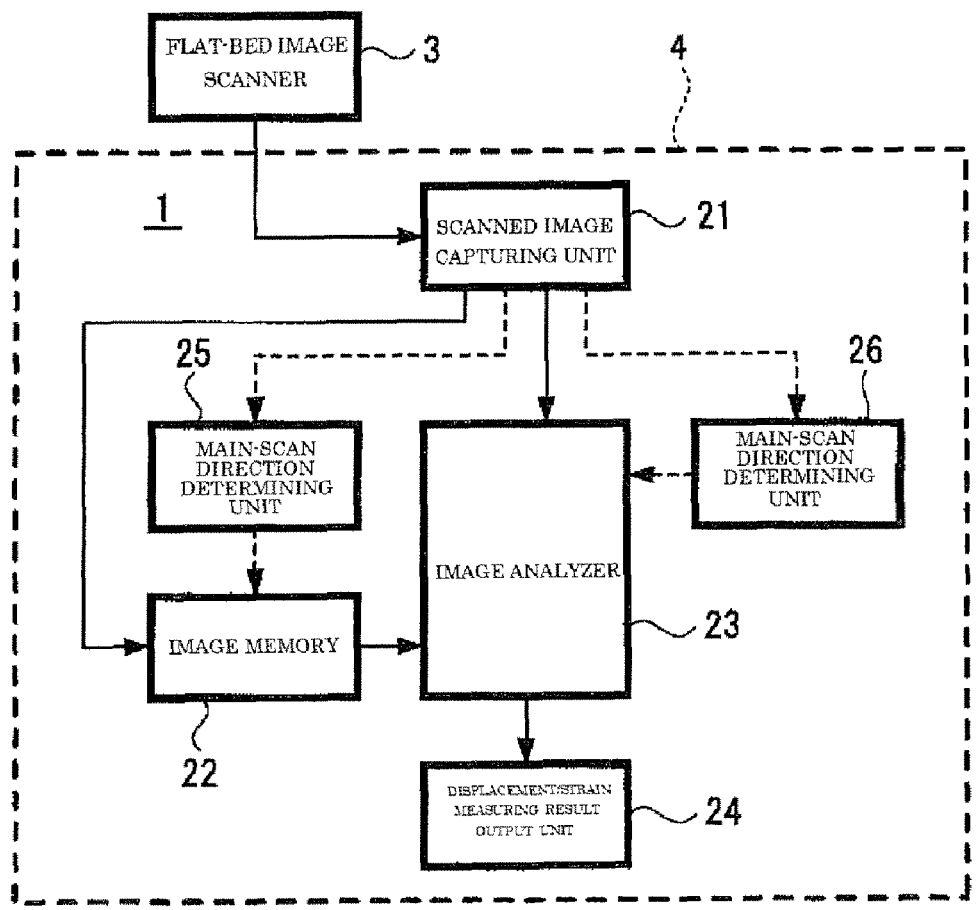
FIG. 3 is a schematic block diagram of a computer in the displacement/strain measuring apparatus according to the present invention.

The personal computer 4, as shown in the schematic block in FIG. 3, is configured to have a scanned image capturing unit 21 which captures the image of the top surface 2A of the to-be-measured object 2 imaged by the flat-bed image scanner 3, an image memory 22 which stores the captured image, particularly, an image before time elapse, an image analyzer 23 which performs image analysis for measuring a displacement or strain to calculate displacement (direction, amount) or strain (direction, amount), a displacement/strain measuring result output unit 24 which outputs the result of measuring a displacement or strain, and main-scan direction determining units 25, 26 which determine only image data in the main scan direction of the line sensor 15 of the flat-bed image scanner 3 in high-precision measurement.

Next, a description now be given of a method of measuring the displacement or strain of a to-be-measured object 2, e.g., a concrete structure, using the displacement/strain measuring apparatus according to the embodiment. The schematic block diagram in FIG. 3 will be referred to.

As shown in FIG. 1, the flat-bed image scanner 3 is arranged in contact with the top surface 2A of the concrete structure 2 or close thereto with a slight clearance in between. For example, a measuring person holds the flat-bed image scanner 3 in hand and sets it against the top surface 2A of the concrete structure 2, and hangs the personal computer, e.g., notebook computer, 4 around the neck to make the screen viewable.

Then, as shown in the schematic block in FIG. 3, the top surface 2A of the concrete structure 2 in the initial state is imaged by driving the flat-bed image scanner 3. The picked-up image is supplied to the scanned image capturing unit 21 of the notebook computer 4. Then, the image in the initial state is stored in the image memory 22. In case of imaging the top surface 2A in a wide range, after a predetermined area is imaged by the flat-bed image scanner 3, the flat-bed image scanner 3 is shifted and placed at another area of the top surface 2A to similarly capture an image, which is in turn stored in the image memory 22.

Next, after a predetermined period (or predetermined time) elapses, the flat-bed image scanner 3 is arranged at the same position on the top surface 2A of the concrete structure 2, i.e., in the same area as that in the initial state, in the same state for imaging. The image after time elapse is supplied to the scanned pixel capturing unit 21 of the notebook computer 4 again as illustrated in the flowchart in FIG. 3. Next, the image in the initial state (or before deformation) stored in the image memory 22, and the image after time elapse (or after deformation) in the scanned image capturing unit 21 are supplied to the image analyzer 23, and are analyzed based on the image analysis method to measure a displacement (direction, amount) or strain (direction, amount). Then, the result of calculating the displacement or strain, or the measuring result, is output from the displacement/strain measuring result output unit 24.

The digital image correlation method can be used as the image analysis method. Next, the principle of the digital image correlation method will be described. The digital image correlation method images an object to be measured before and after deformation with an imaging apparatus, such as a CCD camera, based on the randomness of a pattern on the top surface of the object to be measured, and performs image processing on the acquired digital image to measure the amount of deformation of the top surface of a sample and the direction thereof simultaneously. With a small image area having a plurality of pixels (called sub set) centered at an arbitrary position in an image before deformation being taken as a reference, the amount of deformation and direction thereof are determined by acquiring the position of a sub set which provides the optimal correlation to the reference sub set from an image after deformation. The method of acquiring the correlation is carried out by rough exploration of acquiring the amount of deformation with a measuring precision of pixel units and fine exploration of acquiring the amount of deformation with a precision of the pixel size or less.

In the rough exploration, a correlation function C is obtained using a minimal residual method given in equation 1. Let a sub set be N×N pixels.

$$C(X+u, Y+v) = \sum_{i=-M}^{M} \sum_{j=-M}^{M} \left| I_d(X+u+i, Y+v+j) - I_u(X+i, Y+j) \right| \quad [\text{Eq. 1}]$$

Iu(X, Y) and Id(X+u, Y+v) respectively indicate the intensities of an image before deformation and an image after deformation, X and Y are the center coordinates of the sub set, and u and v are respectively the amounts of pixels moved in the x direction and in the y direction. N=2M+1. The correlation function is calculated while moving the sub set arbitrarily in the x and y directions pixel by pixel. The position at which the value of the sum C in the equation 1 becomes the minimum is a closest pixel at the position to which the center of the sub set is moved.

Figure 4A:
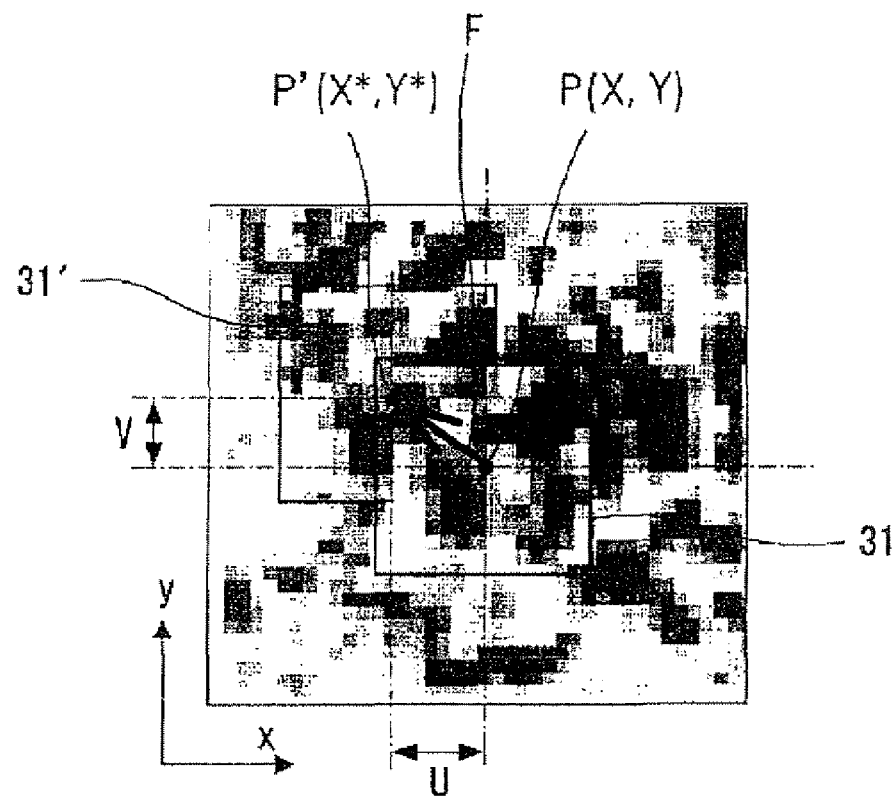
FIGS. 4A and 4B are explanatory diagrams to be used in explaining one example of image analysis to be adapted to the displacement/strain measuring method of the present invention.

FIG. 4 shows the outline of the rough exploration. FIG. 4A is an explanatory diagram showing one example of the positional relationship between a sub set 31 to be a reference before deformation and a sub set 31' which provides an optimal correlation after deformation. P(X,Y) indicates the center point of the image of the reference sub set 31. P'(X*, Y*) indicates the center point of the image of the sub set 31' or the aforementioned closest pixel point. A vector F connecting the center point P(X,Y) of the sub set 31 to the center point P'(X*, Y*) of the sub set 31' represents the amount of deformation and the amount of movement.

Figure 4B:
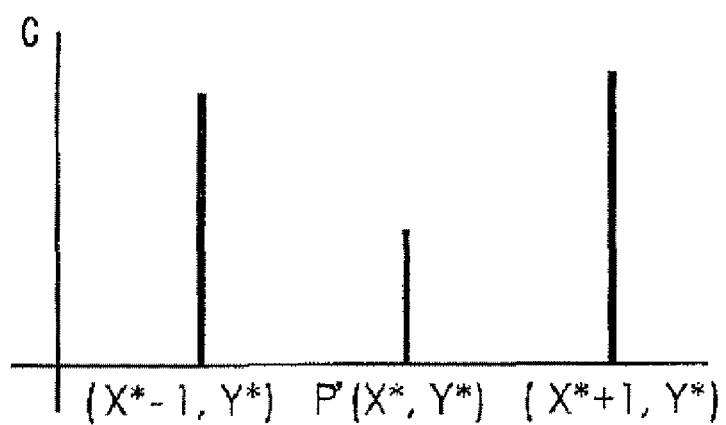

FIG. 4B is an exemplary graph showing the correlation function C at the center point of each sub set which is moved pixel by pixel. The position of P'(X*, Y*) is the closest pixel point which has the minimum value of the correlation function C.

Because the actual amount of movement is smaller than the size of one pixel, however, the position obtained by the equation 1 should not necessarily provide the highest correlation. In this respect, the amount of movement is acquired with a precision of the pixel size or less through the fine exploration. An equation of cross correlation used in the fine exploration is given by an equation 2.

$$C(X+u, Y+v) = 1 - \frac{\sum_{i=-M}^{M}\sum_{j=-M}^{M} I_d(X+u+i, Y+v+j) \times \sum_{i=-M}^{M}\sum_{j=-M}^{M} I_u(X+i, Y+j)}{\sqrt{\left(\sum_{i=-M}^{M}\sum_{j=-M}^{M} I_d(X+u+i, Y+v+j)\right)^2 \times \left(\sum_{i=-M}^{M}\sum_{j=-M}^{M} I_u(X+i, Y+j)\right)^2}}$$ [Eq. 2]

In the fine exploration, interpolation by a quadratic curve approximation is performed on pixels around the closest pixel using a correlation value obtained by the equation 2, and the maximum value of the quadratic curve is set as the position with the optimal correlation. While the equation 2 takes more time in calculation than the equation 1, it has an advantage that a better correlation is obtained when interpolation between pixels is carried out.

Figure 5A:
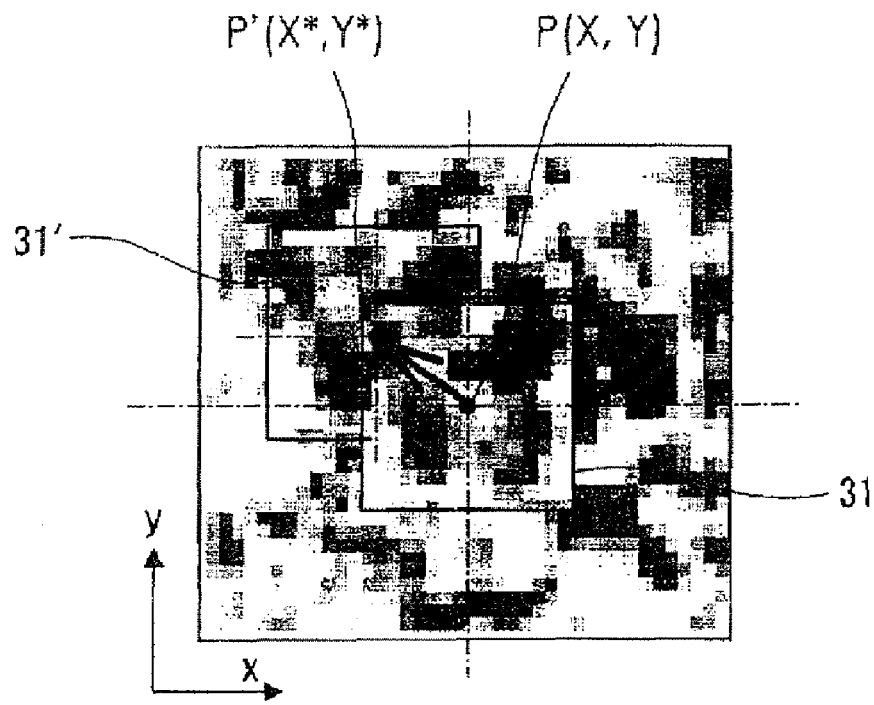
FIGS. 5A and 5B are explanatory diagrams to be used in explaining another example of image analysis to be adapted to the displacement/strain measuring method of the present invention.

FIG. 5 shows the outline of the fine exploration. FIG. 5A, like the foregoing diagram, is an explanatory diagram showing one example of the positional relationship between a sub set 31 to be a reference before deformation and a sub set 31' which provides an optimal correlation when it is moved pixel by pixel after deformation. P(X,Y) indicates the center point of the image of the reference sub set 31. P'(X*, Y*) indicates the center point of the image of the sub set 31' or the aforementioned closest pixel point.

Figure 5B:
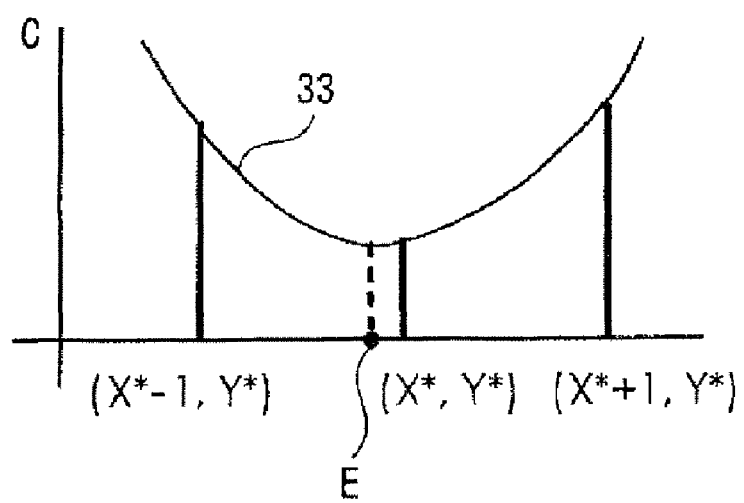

FIG. 5B is an exemplary graph showing the relationship between a quadratic curve approximation 33 acquired using the correlation value at pixels at positions (X*-1,Y*), (X*+1, Y*) around the position of the closest pixel (X*,Y*), and the correlation function C. A position E which provides the best correlation (broken line shown) can be acquired from the minimum value of the quadratic curve approximation 33 with a precision of the pixel size or less.

As the method of acquiring the amount of movement with a measuring precision of the pixel size or less, there is a method of using a correlation coefficient at a pixel point or a method of acquiring a position which provides the highest correlation by performing interpolation between intensity values of discrete pixels and using values acquired by the interpolation.

As in the above example, the former method acquires the amount of movement of one pixel or less from intersections or peaks of a straight line and a curve, such as a linear curve, quadratic curve and Gaussian distribution, using correlation coefficients at a pixel position which provides the highest correlation, and pixel positions around that pixel position.

The latter method acquires a position at which the correlation function has a maximum value by directly interpolating a discrete intensity distribution of a measured image by using an interpolation coefficient, such as a linear or quadratic curve, or Bi-cubic.

There are multiple image analysis methods of acquiring the amount of displacement and the direction of movement using two images, and the above-described method using correlation values is just one of the methods. The present invention can employ another image analysis method other than the digital image correlation method.

According to the embodiment, the displacement/strain measuring method and measuring apparatus can execute high-precision measurement and simplify the measuring work by using a close line scanner typified by a flat-bed image scanner, the flat-bed image scanner 3 in this embodiment, as means of picking up the image of the top surface 2A of an object 2 to be measured. It is possible to overcome all the aforementioned problems of the conventional measuring method and measuring apparatus using a CCD camera.

That is, as the flat-bed image scanner 3 acquires an image, the number of pixels of an image is considerably larger than that of the CCD camera. Even when a flat-bed image scanner commercially available is used, for example, an image with a resolution of as high as 4800 dpi can be captured. The resolution of 4800 dpi in terms of two dimensional pixels like CCD camera pixels is equivalent to 23 million pixels/inch$^2$. Therefore, high-precision measurement can be achieved.

Because the flat-bed image scanner 3 is disposed in contact with or close to the top surface 2A of an object 2 to be measured, and the light source 12 is incorporated in the flat-bed image scanner 3, constant illumination can be maintained without being influenced by external light, thus eliminating the need for adjustment of illumination.

The flat-bed image scanner 3 can capture images over a wide range, and provides strainless images over the entire range. That is, a problem originated from aberration of the lens of a CCD camera does not arise at all.

Further, it is unnecessary to acquire the size of an object to be measured with a scale as done for the CCD camera, eliminating the need for the size structure work. The flat-bed image scanner 3 is light and does not need a special technique, the imaging operation is simple and inexpensive.

The imaging method by the flat-bed image scanner 3 is very simple, and the measuring apparatus 1 itself has a compact configuration with the flat-bed image scanner 3 and the notebook computer 4, and therefore has a high portability and can execute simple displacement and strain measurement. Therefore, it can be expected to make the practical use of the present measuring method as a deterioration diagnosis method, and a maintenance and management method for an equipment and a structure as well as at the job site of research and development.

Figure 6:
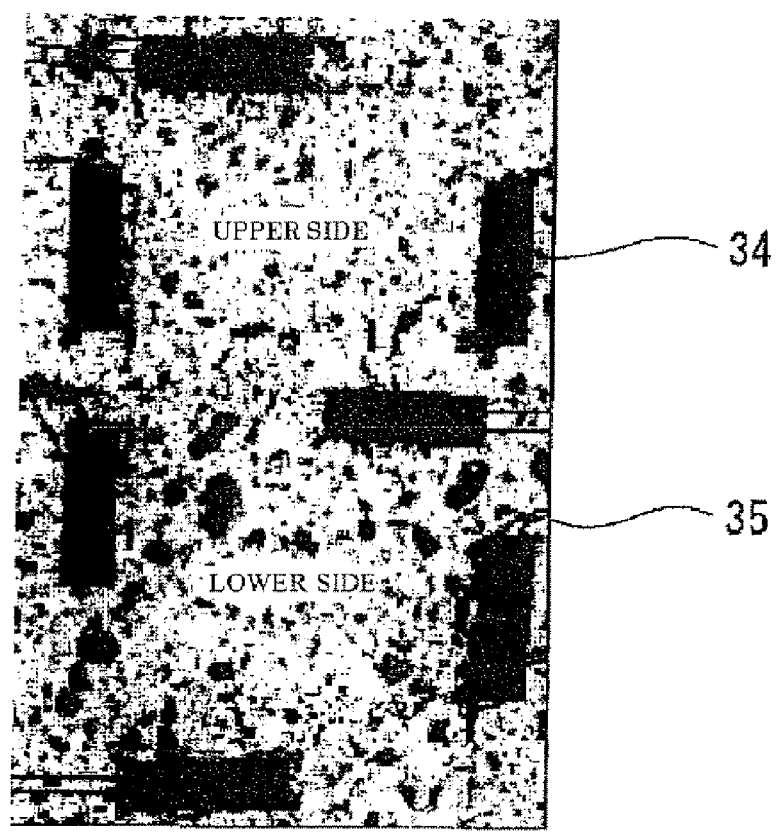
FIG. 6 is a structural diagram of a test sample used in a measuring experiment of the displacement/strain measuring method using the flat-bed image scanner according to the present invention.

To inspect the strain measuring precision, the axial directional strains of concrete, steel and wood, or essential constructional materials, were measured by a flat-bed image scanner and compared with the values of the adhered strain gauge. With regard to concrete, as will be described later, a test sample subjected to surface processing to expose thin aggregates at the top surface. That is, as shown in FIG. 6, a concrete test sample 35 having a plurality of strain gauges 34 adhered to the top surface at which thin aggregates were exposed by polishing was prepared, and strain that would occur at the time of uniaxially loading the test sample 35 was measured by the strain gauges 34 and the method using the flat-bed image scanner according to the embodiment.

surface) with the coating removed in a) and c). In the formation of grains in b), a white acrylic paint thinned with water was sprayed with an air brush at a low pressure of 1 kg/cm$^2$ or less to acquire a pattern of dispersed grains with a size of 1 to 2 mm or so. In the formation of grains in d), a flesh-color acrylic paint thinned with water was sprayed with an air brush to increase the grain size to 2 to 4 mm or so.

Wood having the surface planed was used.

Figure 7:
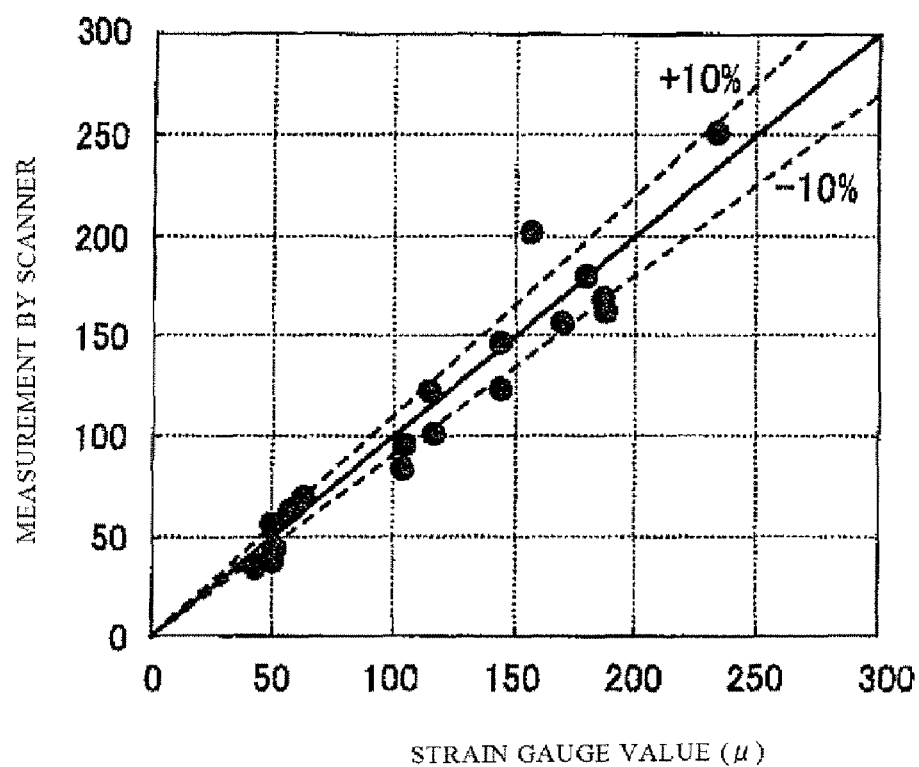
FIG. 7 is a graph showing the relationship between values measured by the scanner and strain gauge values.

The results are shown in Tables 1 and 2 and FIG. 7. The loading load was changed in three steps of 50 kN, 100 kN and 150 kN. The upper side and lower side in Table 1 indicate the upper side and lower side of the test sample 35 in FIG. 6. The values in Table 1 are in the micro units; for example, "63" is $63 \times 10^{-6}$. FIG. 7 shows all data plotted except that of the steel a).

TABLE 1

| test sample | symbol | type of top surface of to-be-measured object | strain gauge value: A μ | | | measurement by scanner: B μ | | |
|---|---|---|---|---|---|---|---|---|
| | | | load | | | | | |
| | | | 50 kN | 100 kN | 150 kN | 50 kN | 100 kN | 150 kN |
| concrete | | thin aggregates exposed by polishing upper portion | 63 | 144 | 233 | 70 | 147 | 252 |
| | | thin aggregates exposed by polishing lower portion | 50 | 144 | 188 | 56 | 123 | 162 |
| steel | a) | rust-proof coating (red) | 48 | 113 | 183 | 10800 | 21182 | — |
| | b) | grains sprayed on rust-proof coating with air brush | 50 | 117 | 187 | 38 | 102 | 169 |
| | c) | rust-proof coating removed to expose steel surface | 51 | 104 | 157 | 44 | 84 | 202 |
| | d) | grains sprayed with air brush with g rust-proof coating removed | 43 | 105 | 170 | 34 | 96 | 157 |
| wood | | planed | 57 | 115 | 180 | 63 | 122 | 180 |

TABLE 2

| test sample | symbol | type of top surface of to-be-measured object | load | | | | | | |
|---|---|---|---|---|---|---|---|---|---|
| | | | error: B-A μ | | | average of absolute value of error | relative error: (B-A)/A % | | |
| | | | 50 kN | 100 kN | 150 kN | | 50 kN | 100 kN | 150 kN |
| concrete | | thin aggregates exposed by polishing upper portion | 7 | 3 | 19 | 9.7 | 11 | 2 | 8 |
| | | thin aggregates exposed by polishing lower portion | 6 | −21 | −26 | 17.7 | 12 | −15 | −14 |
| steel | a) | rust-proof coating (red) | 10752 | 21069 | — | 15911 | 22400 | 18645 | — |
| | b) | grains sprayed on rust-proof coating with air brush | −12 | −15 | −18 | 15.0 | −24 | −13 | −10 |
| | c) | rust-proof coating removed to expose steel surface | −7 | −20 | 45 | 24.0 | −14 | −19 | 29 |
| | d) | grains sprayed with air brash with g rust-proof coating removed | −9 | −9 | −13 | 10.3 | −21 | −9 | −8 |
| wood | | Planed | 6 | 7 | 0 | 4.3 | 11 | 6 | 0 |

With regard to steel, a test sample subjected to surface processing was used. Though not illustrated, the following processes were performed as the surface processing. a) Rust-proof coating (red) was effected. b) Grains were sprayed on the rust-proof coating with an air brush. c) The rust-proof coating was removed to expose a steel surface. d) The rust-proof coating was removed and grains were sprayed with an air brush.

A difference in gradation value is not likely to appear on the coated surface of steel or the top surface of steel (black rust As apparent from Tables 1 and 2 and FIG. 7, in any of the cases where the loading load was changed in three steps, the scanner of the embodiment has a small measuring error of 15% or less, and has a very high precision. That is, the measuring precision about the same as the measuring precision obtained by a strain gauge is obtained. Note that the conventional method using a CCD camera has a strain measuring error of several tens % or greater.

With simple surface processing alone, concrete and wood provided good measuring results. While it was difficult to measure the coating surface of steel (test sample in a) which had a small change in gradation value, coating a pattern of fine grains made measurement possible. Although the read resolution of the flat-bed image scanner is 1200 dpi and 8 bits in the test, the measuring precision is improved further by increasing the resolution.

The measuring method according to the embodiment has advantages such that adjustment of illumination or so is not involved, a special technique is not needed, the measuring apparatus is compact and portable, one set of the measuring apparatus is not expensive, high-definition images can be acquired with a simple operation, displacement and strain measurements are carried out with a high precision, so that the method can be used in various fields. Particularly, when the present method is used in diagnosing strain of concrete structures that contain those which will rapidly exceed the durable years from now on, and in the maintenance and management thereof, a high social contribution can be expected.

In its application to measurement of an ordinary apparatus or equipment, the measuring method according to the foregoing embodiment requires only basic operations: placing the flat-bed image scanner in contact with an object to be measured and scanning the to-be-measured object with the scanner. However, in the case of measuring a concrete structure (e.g., regular inspection or the like), the concrete surface is easily deteriorated by a change in color tone due to stain, mildew or the like, so that when surface deterioration occurs, measurement may not be carried out well.

Next, a description now be given of another embodiment of the displacement/strain measuring method of the present invention which can carry out measurement well even when such surface deterioration occurs in a concrete structure.

Figure 8A:
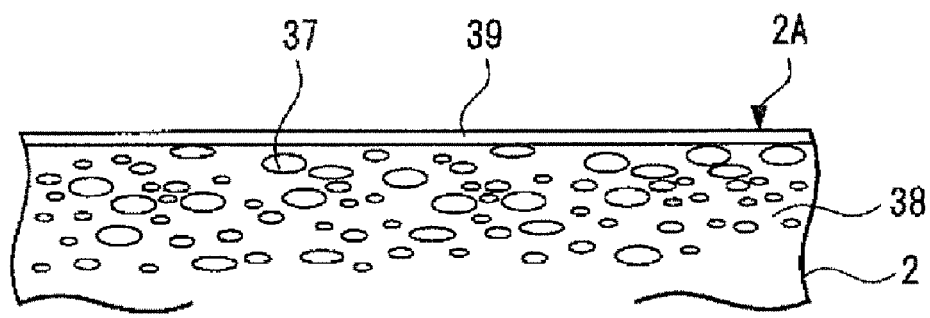
FIGS. 8A to 8C are pre-process step diagrams of an object to be measured which show another embodiment of the displacement/strain measuring method according to the present invention.

As shown in FIG. 8A, a so-called paste layer 39 altered by stain, mildew or the like is formed on the top surface 2A of a concrete structure 2 having thin aggregates 37, such as sands or gravel, kneaded with cement 38.

Figure 8B:
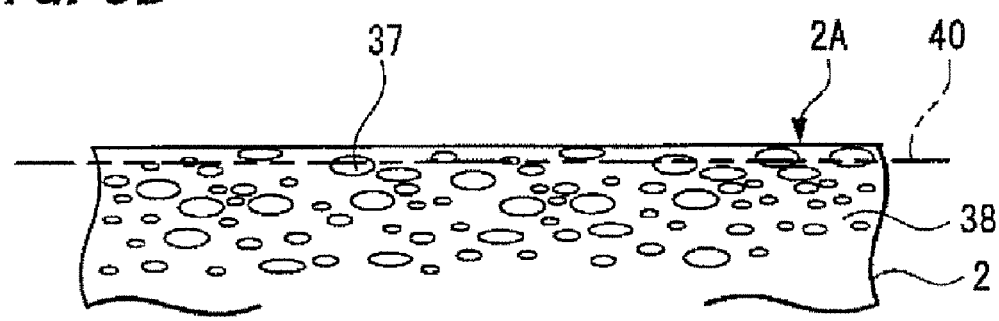

The paste layer 39 on the top surface of the concrete structure 2 is removed by polishing means, such as a grinder, as shown in FIG. 8B.

Figure 8C:
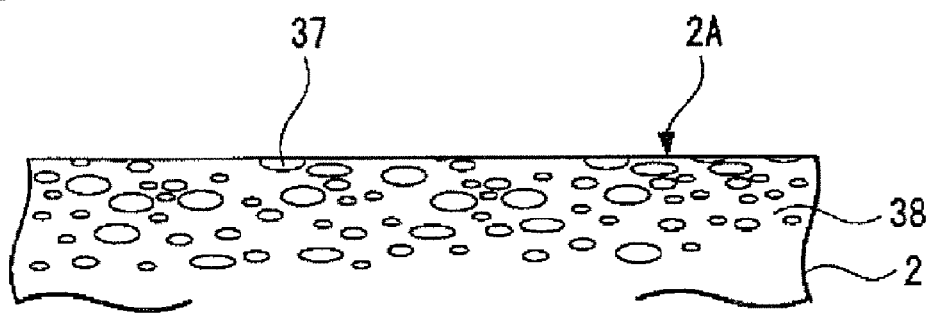

Next, as shown in FIG. 8C, the top surface 2A is polished to be smooth by polishing means, such as an abrasive material or a grinder, until the thin aggregates 37 is exposed to the top surface (polished till a chain line 40 in FIG. 8B). This polishing causes the thin aggregates 37 having a gradation value (luminance value) different from that of the cement 38 is mixed with the cement 38 to be exposed irregularly (at random), so that an irregular pattern appears.

Thereafter, the displacement or strain of the concrete structure 2 is measured by the method that has been described in the foregoing description of the embodiment.

The displacement/strain measuring method according to this embodiment can execute image processing well and measure displacement or strain with a high precision without performing special marking by polishing the top surface 2A of the concrete structure 2 with a grinder or the like before measuring to expose an irregular pattern of the thin aggregates 37 and cement 38 which have different gradation values at the top surface 2A. The aggregate portions have less deteriorate even when a long period elapses, thus ensuring regular and continuous inspection. It becomes easy to determine deterioration of an alkaline aggregate reaction or cracking.

Next, an embodiment for executing total-field-of-view measurement with a higher precision is illustrated as another embodiment of a displacement/strain measuring method and measuring apparatus according to the present invention.

To execute total-field-of-view measurement with a high precision, about the same high precision is demanded in both the X and Y axial directions in a plane. The line scanner which causes the line sensor in FIG. 2 to scan only in one axial direction can be expected to have a high measuring precision in the main scan direction (direction perpendicular to the so-called line sensor scan direction; the lengthwise direction of the line sensor) in which a plurality of pixels of the line sensor are aligned, but the precision of the drive system including the encoder is not so high, so that the measuring precision in the sub scan direction (direction in which the line sensor is scanned) cannot be expected.

In this respect, the measuring apparatus to be used in the displacement/strain measuring method according to the embodiment, particularly, the line sensor of the flat-bed image scanner scans in one direction (e.g., X axial direction) and in another direction perpendicular thereto (e.g., Y axial direction), and image data only in the main scan direction is used in the two scans. Accordingly, image data only in the main scan direction is used both in the X axial direction and the Y axial direction in the total-field-of-view measurement, thereby providing a high measuring precision.

As one example of the configuration of the flat-bed image scanner to cause the line sensor in two axial directions, the flat-bed image scanner can be configured so that the arrangement direction thereof is turned by 90 degrees, or the imaging body including the line sensor can be turned by 90 degrees, to cause the line sensor to scan twice.

Figure 9:
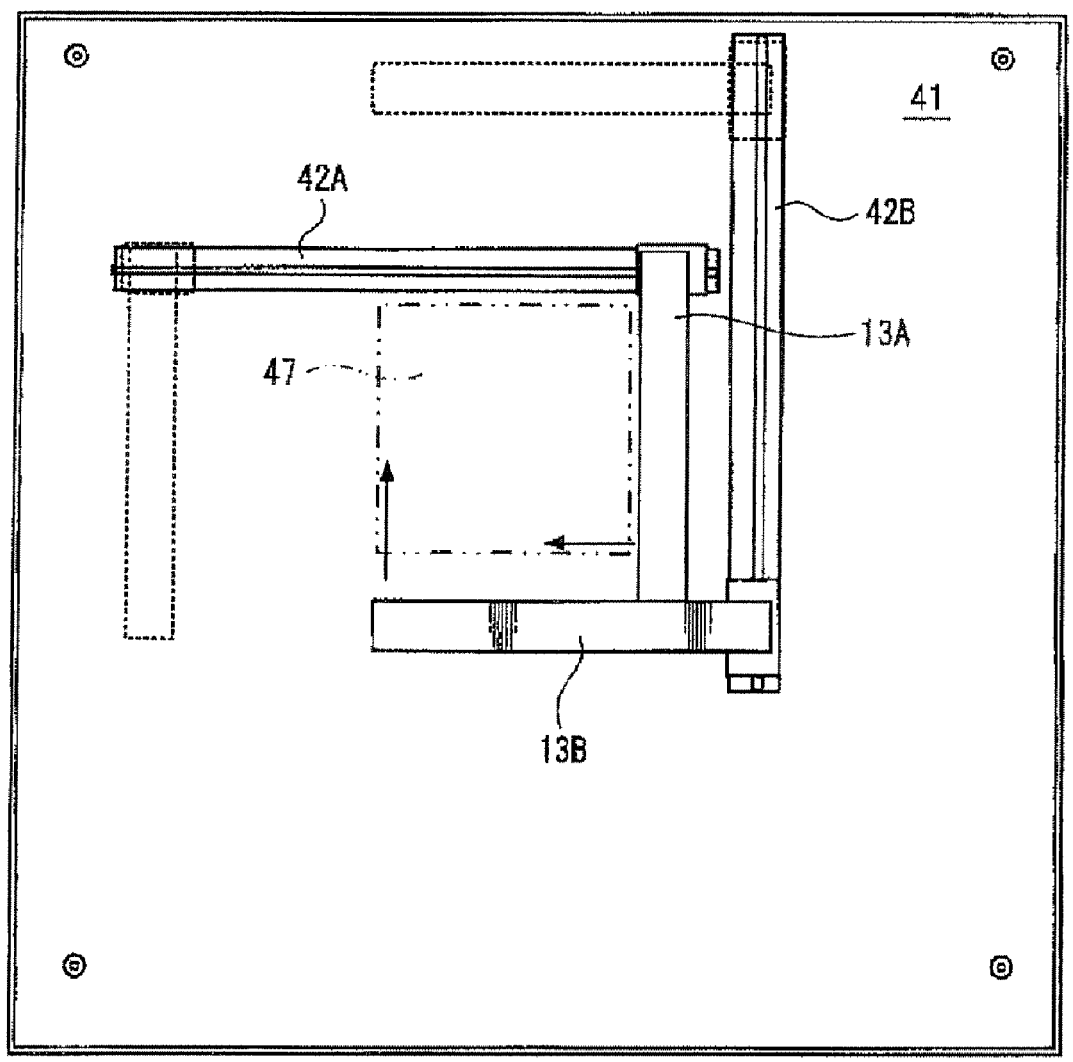
FIG. 9 is an exemplary diagram showing another embodiment of a line sensor mechanism to be adapted to another embodiment of the displacement/strain measuring method according to the present invention.

FIG. 9 shows another example of the configuration of the flat-bed image scanner to cause the line sensor to scan in two axial directions. FIG. 9 is an exemplary diagram of a line sensor mechanism. A line sensor mechanism 41 of this embodiment has two line sensors 13A, 13B arranged to be perpendicular to each other on a plane. The line sensor 13A is arranged to scan on a linear guide rail 42A in the X axial direction, and the line sensor 13B is arranged to scan on a linear guide rail 42B in the Y axial direction. The line sensors 13A, 13B are attached to the linear guide rails 42A, 42B by cantilever beams. In the line sensor mechanism 41, after one line sensor, e.g., the line sensor 13A, scans and then moves to an end portion of the linear guide rail 42A, the other line sensor, e.g., the line sensor 13B, is guided by the linear guide rail 42B to scan. It is to be noted that the line sensors 13A, 13B are configured so as to be able to scan twice so that there hardly is a time difference in the X axial direction and the Y axial direction. Numeral 47 denotes the imaging range of the top surface of an object to be measured.

Figure 10A:
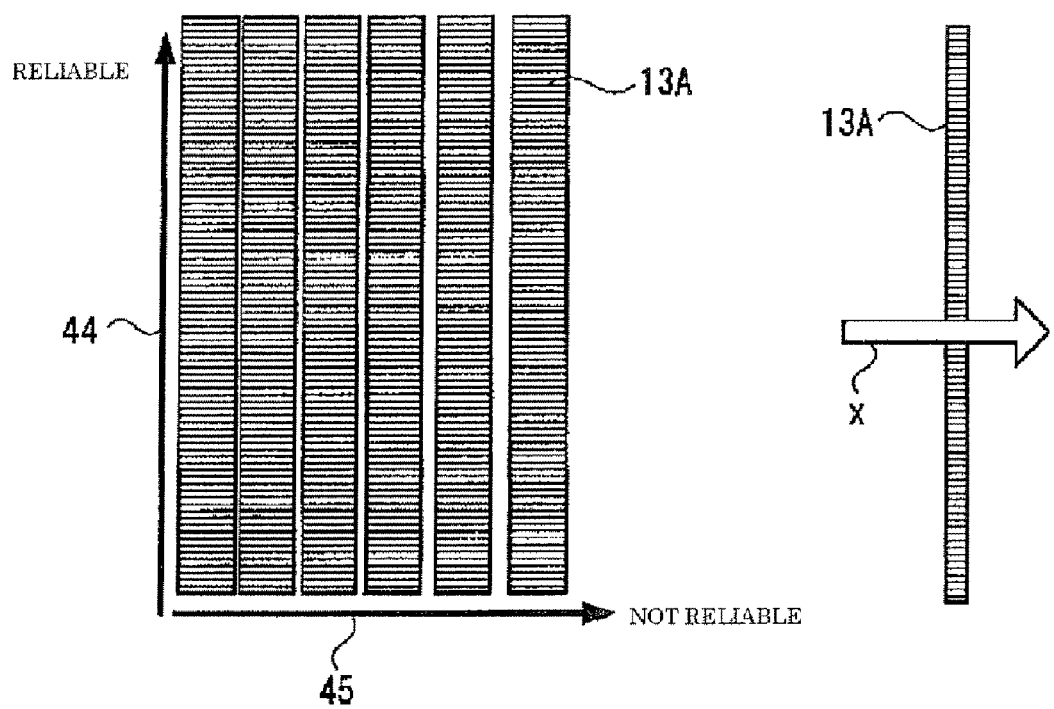
FIGS. 10A and 10B are explanatory diagrams to be used in explaining the displacement/strain measuring method according to the present invention in FIG. 9.
Figure 10B:
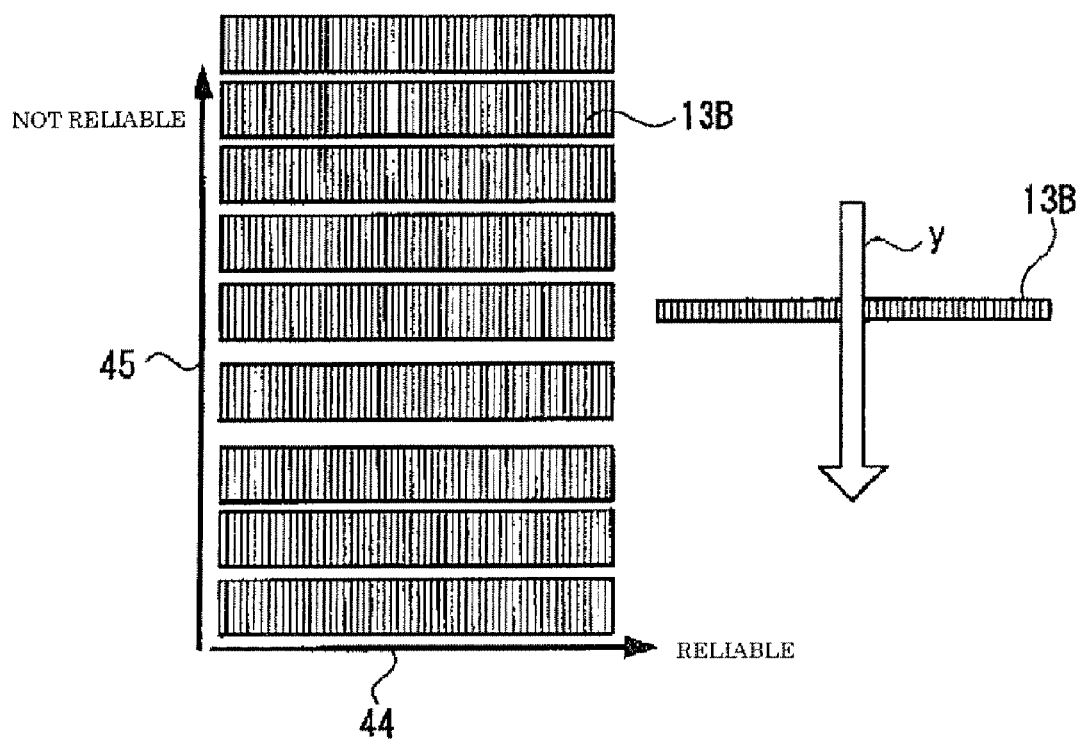

Two images of the top surface of an to-be-measured object are captured using the flat-bed image scanner having the line sensor mechanism 41, and the two images in image data in the main scan direction are combined into a single image to effect the total-field-of-view measurement. This state is shown in FIGS. 10A and 10B. Since multiple pixels are arrayed accurately in the main scan direction (or Y axial direction) 44, as shown in FIG. 10A, when the first line sensor 13A scans in the X axial direction, an image with a high resolution is obtained, but an image has a lower resolution in the sub scan direction (or X axial direction) 45 than in the main scan direction due to the precision of the drive system. Conversely, since multiple pixels are arrayed accurately in the main scan direction (or X axial direction) 44, as shown in FIG. 10B, when the second line sensor 13B scans in the Y axial direction, an image with a high resolution is obtained, but an image has a lower resolution in the sub scan direction (or Y axial direction) 45 than in the main scan direction due to the precision of the drive system.

In this embodiment, as shown in the schematic diagram of FIG. 3, after the image of the top surface of the to-be-measured object imaged by the flat-bed image scanner 3 is captured by the scanned image capturing unit 21 of the notebook computer 4, only image data in the main scan direction in the main-scan direction determining unit 27 is supplied to the image analyzer 23. Of the image before time elapse, only image data in the main scan direction in the main-scan direction determining unit 26 is stored in the image memory 22. The image data in the image memory 22 is supplied to the image analyzer 23. The image analyzer 23 calculates (measures) a displacement or strain from the two images only in the main scan direction through image analysis, and the measuring result is output through the displacement/strain measuring result output unit 24. Accordingly, a high measuring precision is obtained in the total-field-of-view measurement.

Figure 11:
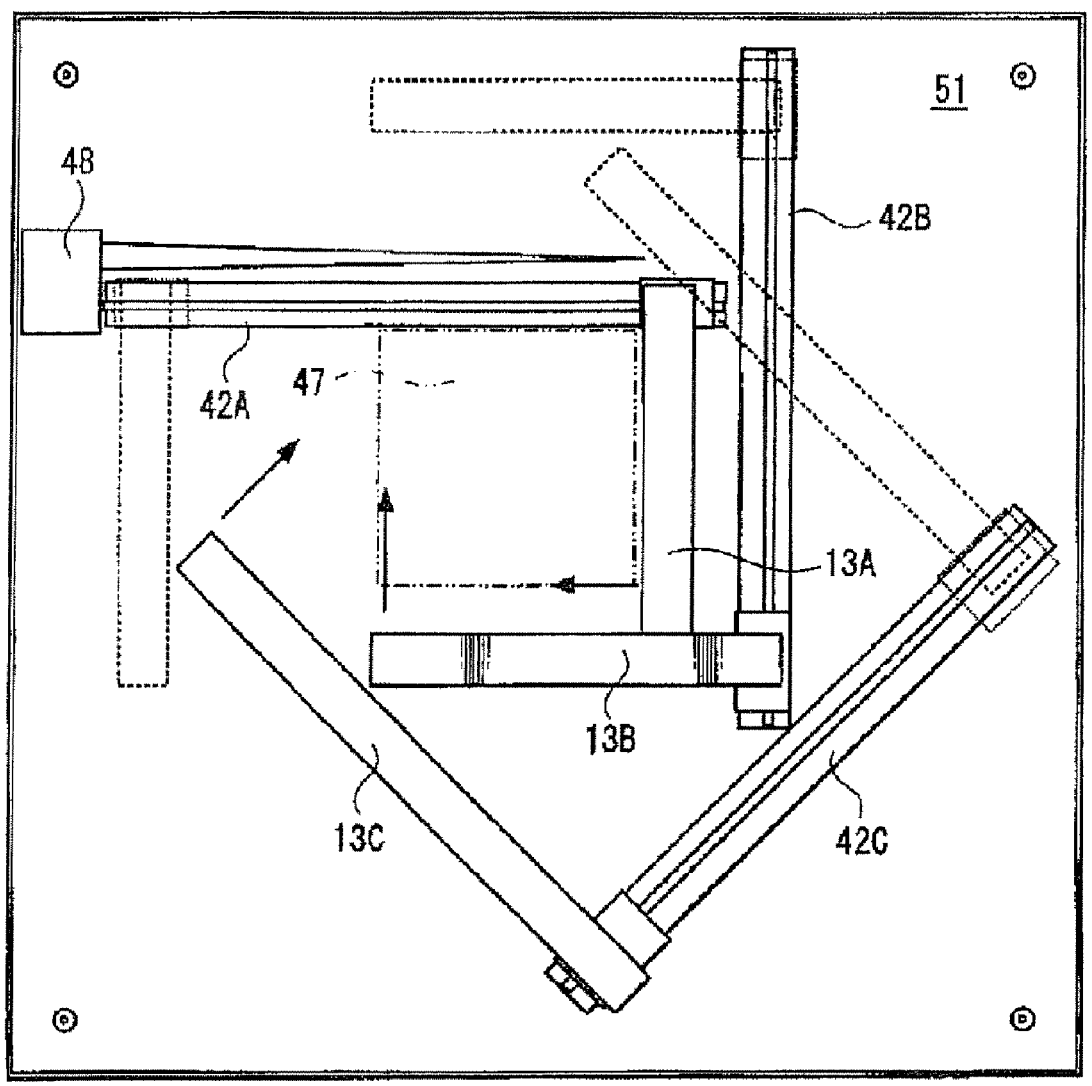
FIG. 11 is an exemplary diagram showing another embodiment of the line sensor mechanism to be adapted to another embodiment of the displacement/strain measuring method according to the present invention.

FIG. 11 shows another embodiment of the line sensor mechanism. When the direction of the principal strain is not clear, it is necessary to measure a strain in three axial directions. A line sensor mechanism 51 according to this embodiment is configured to have three line sensors 13A, 13B, 13C to pick up images in three directions of different angles. The line sensor mechanism 51 is configured to have the first and second line sensors 13A, 13B perpendicular to each other, and the third line sensor 13C arranged at an angle of 45 degrees with respect to the line sensors 13A, 13B, and to cause the line sensors 13A, 13B, 13C scan in the X axial direction, the Y axial direction and a direction at an angle of 45 degrees to the X and Y axes by respective linear guide rails 42A, 42B, 42C. The line sensors 13A, 13B, 13C are attached to the linear guide rails 42A, 42B, 42C by cantilever beams. Numeral 48 denotes a laser displacement gauge for measuring a scan position in the sub scan direction of the line sensor. The laser displacement gauge increases the positional precision in the sub scan direction of the line sensor.

Three images are captured in three scans by the three line sensors 13A, 13B, 13C in the line sensor mechanism 51 of this embodiment, and the three images in image data in the main scan direction are combined into a single image to effect the total-field-of-view measurement.

Figure 12A:
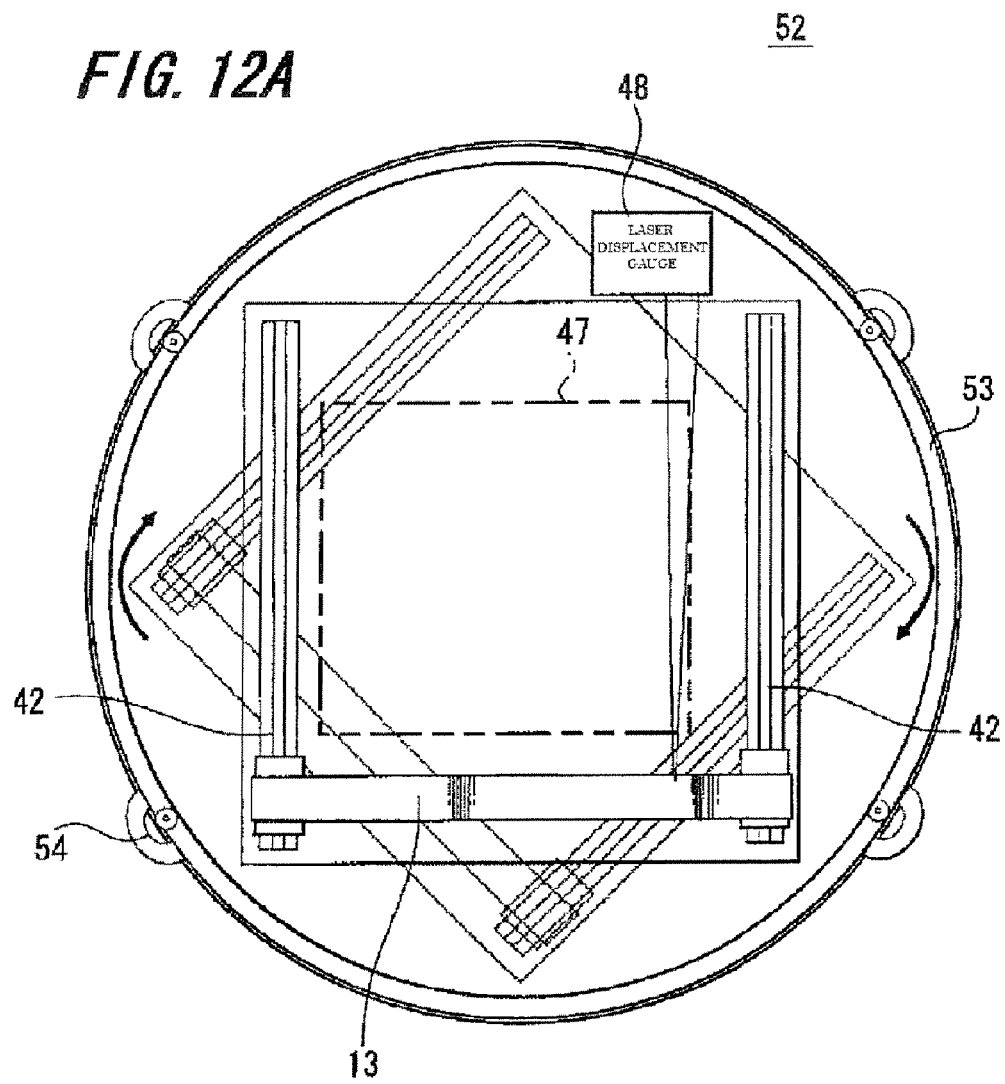
FIGS. 12A and 12B are exemplary diagrams showing another embodiment of the line sensor mechanism to be adapted to another embodiment of the displacement/strain measuring method according to the present invention.
Figure 12B:
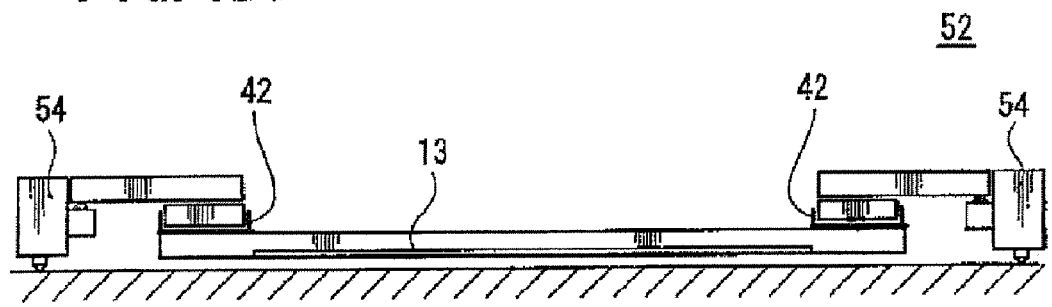

FIGS. 12A and 12B show another embodiment of the line sensor mechanism. A line sensor mechanism 52 of this embodiment is configured to have one line sensor 13 mounted to a rotatable table 53 and capture three images with the angle changed to, for example, three angles of 0 degree, 45 degrees and 90 degrees. The line sensor 13 has both ends attached to a linear guide rail 42. Numeral 48 indicates a laser displacement gauge, and numeral 54 indicates a support member for the line sensor mechanism. In this case, three pieces of image data in the main scan direction are combined into a single image too. High-precision measurement can be carried out using the line sensor mechanism 52.

Figure 13:
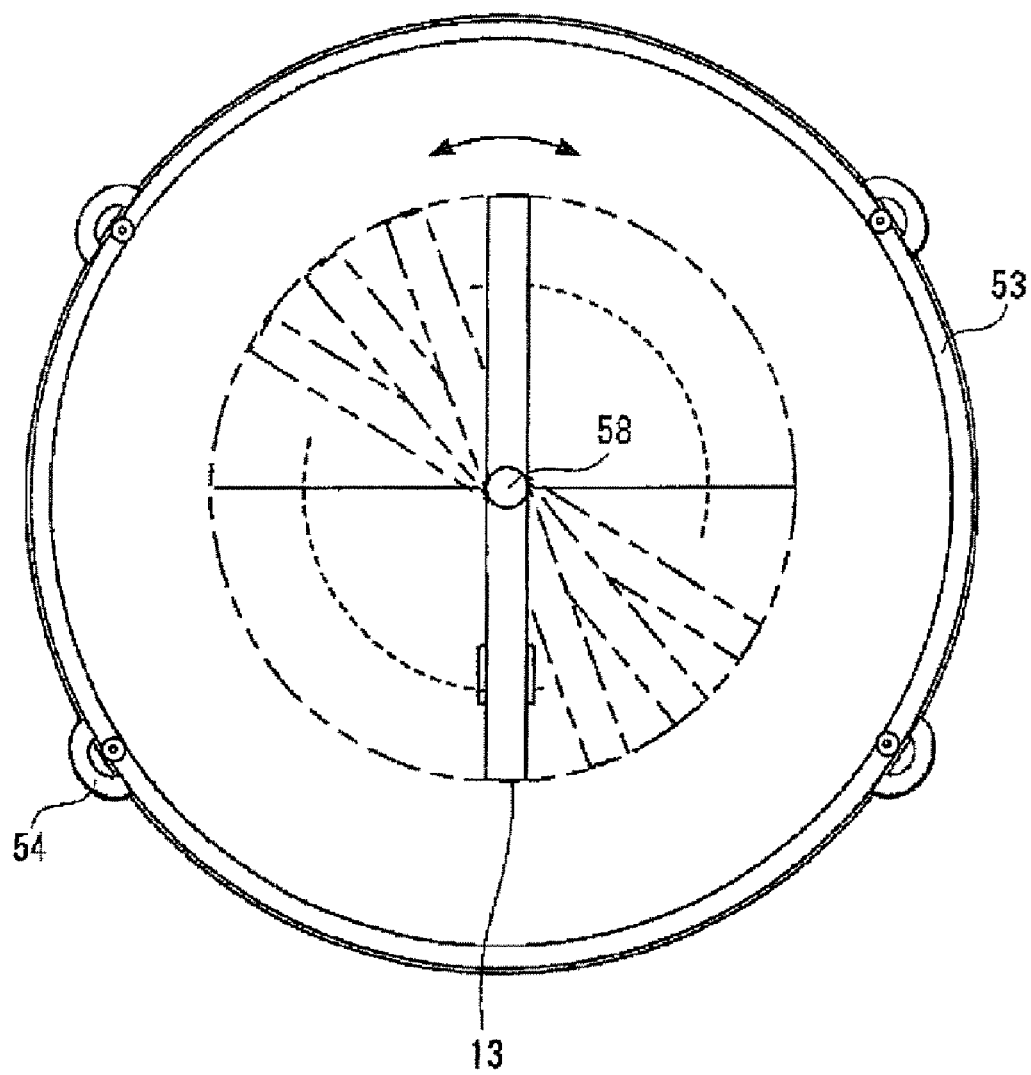
FIG. 13 is an exemplary diagram showing another embodiment of the line sensor mechanism to be adapted to another embodiment of the displacement/strain measuring method according to the present invention.

FIG. 13 shows a further embodiment of the line sensor mechanism. A line sensor mechanism 57 of this embodiment is configured to have the line sensor 13 disposed in the radial direction or the diametrical direction, in this embodiment the diametrical direction, in such a way as to pass a radial center, and disposed rotatable with the radial center being a rotational center, i.e., about a rotating shaft 58 at the radial center, and to rotate the line sensor 13 to pick up the image of the top surface of an object to be measured. In this case, plural pieces of image data in the main scan direction are combined into a single image too. High-precision measurement can be carried out using the line sensor mechanism 57.

While the measuring direction is the main scan direction where a high precision is obtained in the foregoing embodiment, it is not limited to the main scan direction depending on the case. For example, if the amount of movement in the sub scan direction can be controlled accurately by a laser displacement gauge, a linear encoder or the like or information on the amount of movement can be reflected at the time of image analysis, the measuring direction is not limited to the main scan direction, but can be the sub scan direction.

Figure 14:
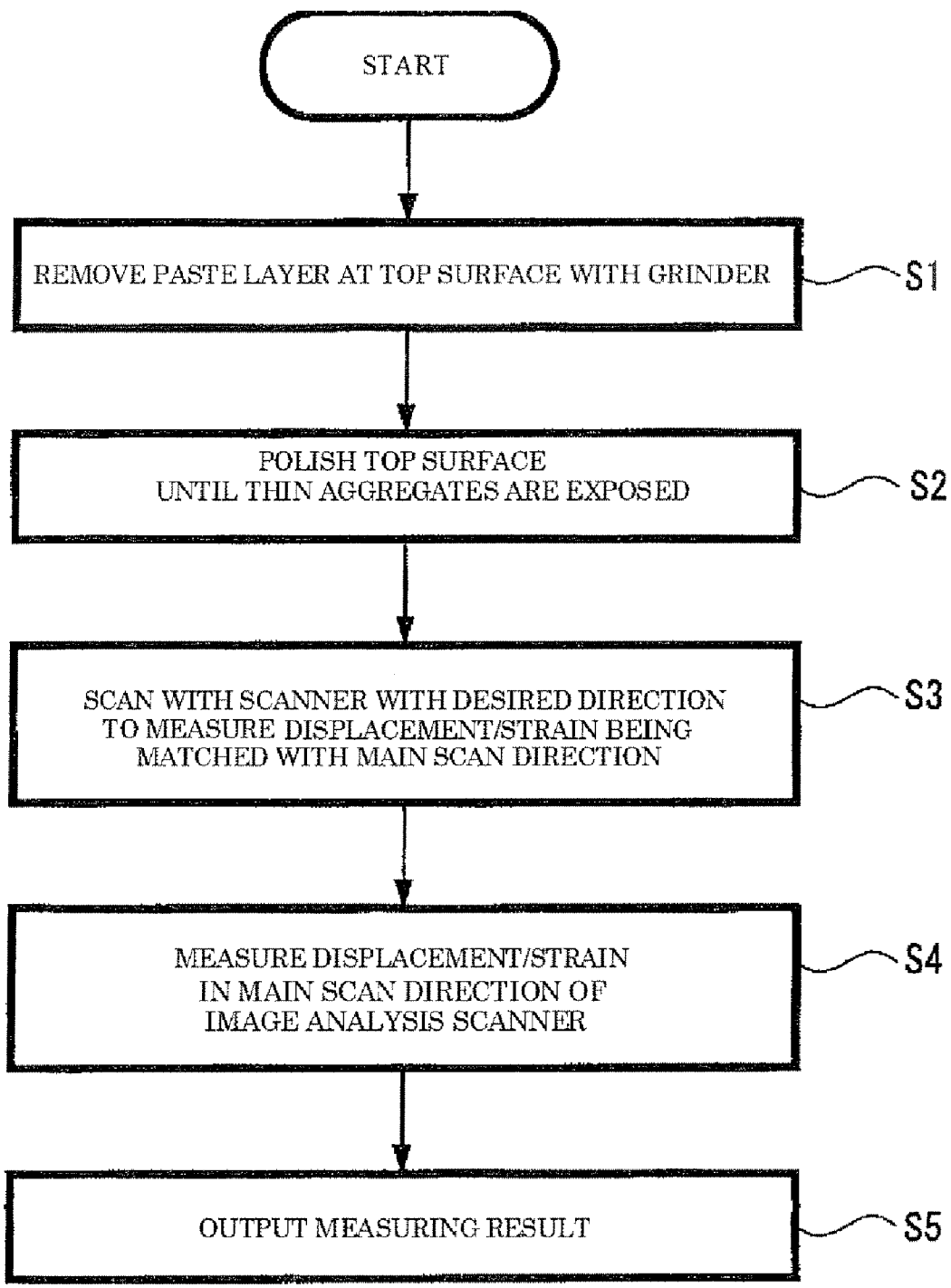
FIG. 14 is a flowchart illustrating another preferred embodiment of the displacement/strain measuring method according to the present invention.

A flowchart in FIG. 14 illustrates a preferred measuring method for measuring a displacement or strain of a concrete structure. First, in step S1, the paste layer at the top surface of the concrete structure is removed by a grinder, for example. Next, in step S2, the top surface of the concrete structure is polished until thin aggregates are exposed to the top surface, and a smooth surface with an irregular pattern having a distribution of different gradation values (luminance values) is formed. Next, in step S3, the image of the irregular-patterned top surface of the concrete structure is picked up using the flat-bed image scanner, and is captured into the notebook computer as mentioned above, and scanning with the flat-bed image scanner is carried out with the desired direction to measure a displacement or strain being matched with the main scan direction. Next, in step S4, image analysis is performed using only image data in the main scan direction to measure a displacement or strain (direction, amount) in the main scan direction.

In next step S5, the measuring result is output and the measurement is then terminated.

According to this embodiment, measuring results with the most preferable high precision in measuring a concrete structure are acquired by producing an irregular pattern through surface results, and using only image data in the main scan direction of the flat-bed image scanner.

While the foregoing illustrates the embodiment where the top surface of the object to be measured is polished to produce an irregular pattern, an irregular pattern may be transferred to the top surface of the object to be measured as another way. That is, in case of an object to be measured which has a small change in gradation, an irregular pattern may be sprayed (or transferred) onto the top surface of the object to be measured with an air brush or spray paint, the top surface of the to-be-measured object may be imaged by the flat-bed image scanner, and image analysis may be performed from the image of the to-be-measured surface having the irregular pattern transferred thereto to measure a displacement or strain.

The present invention can be adapted in various fields. For example, the present invention can be adapted in the research and development phase, and the design phase. It is possible to carry out total-field-of-view measurement on those objects whose measurement with a strain gauge has been considered inappropriate or which make adhesion of the strain gauge difficult, thereby providing research and development, and design data of various kinds of materials and products. Examples include a) a minute object of several mm or less, b) a non-uniform object or a discontinuous object, such as a composite material, c) an object with large irregularities in a plane, and a porous object, d) an aggregate of solid particles (soil or tablet), and D) a viscous object. Measurement of strains of those objects is possible.

The present invention can be adapted to the manufacturing and operational phases. That is, the present invention can be widely applied in control in the fabrication process of parts and apparatuses, in a plant, and in the operational control of structures. Examples include a) strain (deformation) control in assembling small parts and after a heat treatment, b) control of residual stress occurring at the time of welding mechanical parts, equipment, plant or steel structures, c) safety control by monitoring the stress state in temporary work of support, bracing and shore strut at the time of building a structure, d) grasping of the stress state of each portion after installation of cantilever beam or after an increase in dead load (e.g., a substructure after construction of a superstructure, poles and beams supporting a floor after the floor is constructed), e) grasping excessive stress originating from displacement of the foundation or support, or sinking), and f) grasping of temperature stress at the time of concrete construction or strain originating from drying shrinkage.

The present invention can also be adapted to the maintenance (safety) control phase. Examples include a) use as a device of maintaining, inspecting and health-monitoring aircraft, ships, and trains, or use as a device for inspecting, and maintaining and controlling equipment and structures, and b) regularly measuring a strain of a part or member to predict or control residual stress, occurrence of cracking from residual strain, reduction in mechanical performance, etc.

DESCRIPTION OF REFERENCE SYMBOLS

1: displacement/strain measuring apparatus, 2: object to be measured, 3: line scanner apparatus, 4: computer, 11: casing, 12: light source, 13, 13A, 13B, 13C: line sensor, 14: imaging body, 15: transparent protection plate, 16: guide rail, 21: scanned image capturing unit, 22: image memory, 23: image analyzer, 24: displacement/strain measuring result output unit, 25, 26: main-scan direction determining unit, 31, 31': sub ret, 33: quadratic curve approximation, 34: strain gauge, 35: test sample, 37: thin aggregates, 38: cement, 39: paste layer, 41, 51, 52, 57: line sensor mechanism, 42A, 42B, 42C: linear guide rail, 44: main scan direction, 46: sub scan direction, 47: imaging range, 48: laser displacement gauge, 53: table, 54: support member

We claim:

1. A structural displacement/strain measuring method comprising, the steps of:
    measuring a predetermined time before and after a time elapse;
    capturing images of a surface of a to-be-measured object by
        providing a hand-held line scanner apparatus in close adhesion or in vicinity of the surface of the to-be-measured object;
    calculating a displacement or strain of the to-be measured object by
        adapting an image analysis method to the images of the surface of the to-be-measured object captured before and after the time elapse, wherein the image analysis method includes the steps of:
        determining a first minute area in the image before the time elapse,
        acquiring a distribution of gradation values in the first minute area,
        comparing a distribution of gradation values in the image after the time elapse and the distribution of gradation values in the first minute area, and
        specifying, in the image after the time elapse, a second minute area of which a correlation with the distribution of gradation values in the first minute area is maximized; and
    shifting the hand-held line scanner apparatus relative to the surface of the to-be-measured object and repeating the calculating step.

2. The structural displacement/strain measuring method according to claim 1, wherein an irregular pattern identifiable by different gradation values is exposed at the surface of the to-be-measured object, and an image of the surface of the to-be-measured object is captured by the hand-held line scanner apparatus.

3. The structural displacement/strain measuring method according to claim 1, wherein an image of the surface of the to-be-measured object which has an irregular pattern identifiable by different gradation values transferred thereto is captured.

4. The structural displacement/strain measuring method according to claim 1, wherein an omnidirectional displacement or strain on a plane of an image is measured by the image analysis.

5. The structural displacement/strain measuring method according to claim 2, wherein an omnidirectional displacement or strain on a plane of an image is measured by the image analysis.

6. The structural displacement/strain measuring method according to claim 3, wherein an omnidirectional displacement or strain on a plane of an image is measured by the image analysis.

7. The structural displacement/strain measuring method according to claim 1, wherein an image of the surface of the to-be-measured object imaged through scanning in two axial directions or three axial directions by a line sensor of the hand-held line scanner apparatus is captured.

8. The structural displacement/strain measuring method according to claim 2, wherein an image of the surface of the to-be-measured object imaged through scanning in two axial directions or three axial directions by a line sensor of the hand-held line scanner apparatus is captured.

9. The structural displacement/strain measuring method according to claim 3, wherein an image of the surface of the to-be-measured object imaged through scanning in two axial directions or three axial directions by a line sensor of the hand-held line scanner apparatus is captured.

10. A structural displacement/strain measuring apparatus comprising:
    a hand-held line scanner apparatus that is manually repositionable relative to a surface of a to-be-measured object, wherein the hand-held line scanner apparatus includes a light source and a line sensor; and
    means for
        measuring a predetermined time before and after a time elapse,
        capturing images of the surface of the to-be-measured object by
            arranging the line scanner apparatus in close adhesion or in vicinity of the surface of the to-be-measured object, and
        calculating a displacement or strain of the to-be-measured object by
            adapting an image analysis method to the images of the surface of the to-be-measured object captured before and after the time elapse, wherein the image analysis includes
            determining a first minute area in the image before the time elapse,
            acquiring a distribution of gradation values in the first minute area,
            comparing a distribution of gradation values in the image after the time elapse and the distribution of gradation values in the first minute area, and
            specifying, in the image after the time elapse, a second minute area of which a correlation with the distribution of gradation values in the first minute area is maximized, wherein the hand-held line scanner apparatus is connected to the means.

11. The structural displacement/strain measuring apparatus according to claim 10, wherein the hand-held line scanner apparatus includes two line sensors in two axial directions or three line sensors in three axial directions on a plane.

12. The structural displacement/strain measuring apparatus according to claim 10, wherein the line sensor of the hand-held line scanner apparatus is disposed rotatable on a plane.

13. The structural displacement/strain measuring apparatus according to claim 10, wherein the line sensor of the hand-held line scanner apparatus is disposed in a radial direction or a diametrical direction in such a way as to pass a radial center, and is disposed rotatable with the radial center being a rotational center.

* * * * *